(12) United States Patent
Smith

(10) Patent No.: US 7,824,270 B2
(45) Date of Patent: Nov. 2, 2010

(54) FLEXIBLE COUPLING

(75) Inventor: Wayne A. Smith, Holland Patent, NY (US)

(73) Assignee: C-Flex Bearing Co., Inc., Frankfort, NY (US)

( * ) Notice: Subject to any disclaimer, the term of this patent is extended or adjusted under 35 U.S.C. 154(b) by 238 days.

(21) Appl. No.: 11/656,365

(22) Filed: Jan. 23, 2007

(65) Prior Publication Data

US 2008/0176661 A1 Jul. 24, 2008

(51) Int. Cl.
*F16D 3/79* (2006.01)
(52) U.S. Cl. ....................................................... 464/99
(58) Field of Classification Search ............. 464/78–79, 464/99; 267/162, 181
See application file for complete search history.

(56) References Cited

U.S. PATENT DOCUMENTS

| | | | |
|---|---|---|---|
| 1,359,157 A | 11/1920 | Dexter |
| 1,472,782 A | 11/1923 | Barber |
| 1,557,958 A | 10/1925 | Anderson |
| 1,558,576 A | 10/1925 | Bauman |
| 2,196,841 A | 4/1940 | Sloan |
| 2,245,764 A | 6/1941 | Dome |
| 2,254,566 A | 9/1941 | Cornell |
| 2,888,258 A | 5/1959 | Hoffstrom |
| 2,979,925 A | 4/1961 | Hungerford |
| 3,000,198 A | 9/1961 | Stout |
| 3,071,942 A | 1/1963 | Alcaro |
| 3,124,942 A | 3/1964 | Rothfuss |
| 3,150,506 A | 9/1964 | Alcaro |
| 3,347,061 A | 10/1967 | Steumky |
| 3,395,553 A | 8/1968 | Stout |
| 3,430,457 A | 3/1969 | Gee |
| 3,537,275 A | 11/1970 | Smith |
| 3,597,938 A | 8/1971 | Hellen et al. |
| 3,618,721 A | 11/1971 | Hare |
| 3,618,730 A | 11/1971 | Mould, III |
| 3,668,030 A | 6/1972 | Broderick |
| 3,844,137 A | 10/1974 | Zugel |

(Continued)

FOREIGN PATENT DOCUMENTS

GB 489018 * 10/1936 .................. 464/99

OTHER PUBLICATIONS

Shigeley et al. Mechanical Engineering Design. N.Y., McGraw-Hill Book Co., 1983. p. 412.*

(Continued)

*Primary Examiner*—Greg Binda
(74) *Attorney, Agent, or Firm*—Marjama Muldoon Blasiak & Sullivan, LLP

(57) ABSTRACT

A flexible coupling for flexibly joining two rotating or moveable members includes a unitized body having a first end and a second end coaxial to each other, and therebetween having one or more coaxial longitudinally spaced disks with center holes; two or more axial spacing portions formed from the body of each disk to provide a spacing means and joining means for unitizing the disks to each other; means for joining the unitized disks to the first and second ends; and means at the first end for coaxially connecting to a first one of the two rotating or moveable members, and means at the second end for coaxially connecting to a second one of the two rotating or moveable members.

50 Claims, 5 Drawing Sheets

U.S. PATENT DOCUMENTS

| | | | |
|---|---|---|---|
| 3,864,940 A | 2/1975 | Black |
| 3,883,353 A | 5/1975 | Cohen et al. |
| 3,893,554 A | 7/1975 | Wason |
| 3,934,428 A | 1/1976 | Hedin et al. |
| 3,959,988 A | 6/1976 | McNamee et al. |
| 4,017,196 A | 4/1977 | Pean et al. |
| 4,043,546 A * | 8/1977 | Ashfield et al. ............. 267/162 |
| 4,054,128 A | 10/1977 | Seufert et al. |
| 4,059,479 A | 11/1977 | Tanazawa et al. |
| 4,102,734 A | 7/1978 | Schiffman |
| 4,108,211 A | 8/1978 | Tanaka et al. |
| 4,108,683 A | 8/1978 | Anderson |
| 4,133,188 A | 1/1979 | Cartwright |
| 4,176,662 A | 12/1979 | Frazer |
| 4,190,138 A | 2/1980 | Bendall |
| 4,262,186 A | 4/1981 | Provancher |
| 4,265,099 A | 5/1981 | Johnson et al. |
| 4,276,758 A | 7/1981 | Coman et al. |
| 4,357,137 A | 11/1982 | Brown |
| 4,416,645 A | 11/1983 | Fredericks |
| 4,432,349 A | 2/1984 | Oshiro et al. |
| 4,432,853 A | 2/1984 | Banks |
| 4,449,955 A | 5/1984 | Watanabe et al. |
| 4,523,916 A | 6/1985 | Kizler et al. |
| 4,690,661 A | 9/1987 | Fredericks |
| 4,790,794 A | 12/1988 | Takeda et al. |
| 4,802,882 A | 2/1989 | Heidrich et al. |
| 5,020,207 A | 6/1991 | Minoda et al. |
| 5,033,988 A | 7/1991 | McGuire et al. |
| 5,041,060 A | 8/1991 | Hendershot |
| 5,047,116 A | 9/1991 | Luthi et al. |
| 5,062,619 A | 11/1991 | Sato et al. |
| 5,123,311 A | 6/1992 | Dymek |
| 5,147,763 A | 9/1992 | Kamitakahara et al. |
| 5,158,504 A | 10/1992 | Stocco |
| 5,238,454 A | 8/1993 | Schmidt et al. |
| 5,269,882 A | 12/1993 | Jacobsen |
| 5,299,980 A | 4/1994 | Agius |
| 5,324,235 A | 6/1994 | Tomii et al. |
| 5,348,616 A | 9/1994 | Hartman et al. |
| 5,364,309 A | 11/1994 | Heidrich et al. |
| 5,421,955 A | 6/1995 | Lau et al. |
| 5,468,188 A | 11/1995 | Day |
| 5,481,184 A | 1/1996 | Jacobsen |
| 5,540,621 A | 7/1996 | Keester et al. |
| 5,704,898 A | 1/1998 | Kokish |
| 5,724,715 A | 3/1998 | Byerly et al. |
| 5,741,429 A | 4/1998 | Donadio |
| 5,903,116 A | 5/1999 | Geis et al. |
| 5,928,136 A | 7/1999 | Barry |
| 5,966,995 A | 10/1999 | Edwards, Jr. et al. |
| 5,986,364 A | 11/1999 | Bingle et al. |
| 6,022,343 A | 2/2000 | Johnson et al. |
| 6,027,863 A | 2/2000 | Donadio, III |
| 6,086,773 A | 7/2000 | Dufresne et al. |
| 6,106,889 A | 8/2000 | Beavers et al. |
| 6,107,004 A | 8/2000 | Donadio, III |
| 6,146,814 A | 11/2000 | Millet |
| 6,162,171 A | 12/2000 | Ng et al. |
| 6,176,784 B1 | 1/2001 | Albers et al. |
| 6,203,437 B1 | 3/2001 | Durie et al. |
| 6,203,732 B1 | 3/2001 | Clubb et al. |
| 6,246,914 B1 | 6/2001 | de la Rama et al. |
| 6,274,294 B1 | 8/2001 | Hines |
| 6,283,868 B1 | 9/2001 | Clarke et al. |
| 6,315,670 B1 | 11/2001 | Andra et al. |
| 6,500,130 B2 | 12/2002 | Kinsella et al. |
| 6,537,459 B1 | 3/2003 | Dufresne et al. |
| 6,542,218 B2 | 4/2003 | Anderson et al. |
| 6,545,748 B1 | 4/2003 | Trozera |
| 6,558,733 B1 | 5/2003 | Hossainy et al. |
| 6,562,022 B2 | 5/2003 | Hoste et al. |
| 6,585,719 B2 | 7/2003 | Wang |
| 6,638,267 B1 | 10/2003 | Esselstein et al. |
| 6,652,508 B2 | 11/2003 | Griffin et al. |
| 6,682,875 B2 | 1/2004 | Kriksunov et al. |
| 6,692,482 B2 | 2/2004 | Heller et al. |
| 6,716,207 B2 | 4/2004 | Farnholtz |
| 6,719,748 B2 | 4/2004 | Wang |
| 6,723,335 B1 | 4/2004 | Moehlenbruck et al. |
| 6,726,829 B2 | 4/2004 | Trozera |
| 6,774,985 B2 | 8/2004 | Trozera |
| 6,786,876 B2 | 9/2004 | Cox |
| 6,905,416 B2 | 6/2005 | Byerly |
| 6,955,686 B2 | 10/2005 | Majercak et al. |
| 6,968,619 B2 | 11/2005 | Lewis et al. |
| 6,998,060 B2 | 2/2006 | Tomonto |
| 7,001,369 B2 | 2/2006 | Griffin et al. |
| 7,052,489 B2 | 5/2006 | Griego et al. |
| 7,070,033 B2 | 7/2006 | Jansen |
| 7,097,564 B2 | 8/2006 | Berg |
| 7,208,190 B2 | 4/2007 | Verlee et al. |
| 7,239,940 B2 | 7/2007 | Wang et al. |
| 7,303,533 B2 | 12/2007 | Johansen et al. |
| 7,322,105 B2 | 1/2008 | Lewis |
| 7,335,314 B2 | 2/2008 | Wu et al. |
| 7,354,519 B1 | 4/2008 | Fank et al. |
| 7,398,598 B2 | 7/2008 | Lewis at al. |
| 7,448,993 B2 | 11/2008 | Yokoi at al. |
| 2003/0022720 A1 | 1/2003 | Takei |
| 2004/0077930 A1 | 4/2004 | Guenier et al. |
| 2004/0176172 A1 * | 9/2004 | Berg .......................... 464/78 |
| 2004/0199052 A1 | 10/2004 | Banik et al. |
| 2005/0075538 A1 | 4/2005 | Banik et al. |
| 2005/0085693 A1 | 4/2005 | Belson et al. |
| 2005/0131279 A1 | 6/2005 | Boulais et al. |
| 2005/0182298 A1 | 8/2005 | Ikeda et al. |
| 2006/0111615 A1 | 5/2006 | Danitz et al. |
| 2006/0199999 A1 | 9/2006 | Ikeda et al. |
| 2007/0049800 A1 | 3/2007 | Boulais |
| 2007/0282356 A1 | 12/2007 | Sonnenschein et al. |
| 2008/0132761 A1 | 6/2008 | Sonnenschein et al. |
| 2008/0287741 A1 | 11/2008 | Ostrovsky et al. |

OTHER PUBLICATIONS

U.S. Appl. No. 12/397,767, filed Mar. 4, 2009 entitled "Flexible Coupling" (specification including claims attached).

* cited by examiner

US 7,824,270 B2

FLEXIBLE COUPLING

CROSS REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISK APPENDIX

NOT APPLICABLE

BACKGROUND OF THE INVENTION

The present invention relates to a flexible coupling for co-axially joining two rotating or moveable members, and more particularly to a flexible coupling utilizing flexible disks to join two rotating shafts.

Prior art flexible couplings, used for interconnecting wide varieties of rotating driving and driven components, are offered in a variety of configurations to accommodate radial, axial, and angular misalignments, while transmitting required torque between the driving and driven components. Two basic types are available, single and multi-piece flexible couplings. Single piece flexible couplings include radial, helical, and spiral slotted beam type, along with bellows type. These type of couplings are either formed from a single piece of material, or are welded or brazed into a single unitary construction. Multi-piece flexible couplings incorporate flexible metal disks or a non-metallic flexible material, coupled to driving and driven ends. For a particular application, each type must be evaluated in terms of torque capacity, torsional stiffness, electrical continuity, mis-alignment capacity, environmental resistance, life expectancy, and pricing. Flexible couplings of these prior art types, designed for high torsional stiffness, and large torque capacity, cannot accept large mis-alignments without substantial reductions in life expectancy. Flexible couplings of these prior art types, designed for large mis-alignments, have low torsional stiffness and low torque capacity.

It is the object of this invention to provide a novel flexible coupling which is economical to produce, while still capable of achieving high torsional stiffness and torque capacity while allowing for large mis-alignments and long cycle life.

BRIEF SUMMARY OF THE INVENTION

According to the invention, a flexible coupling for flexibly coupling two rotating or moveable members, comprises a unitized body having a first end, a second end, and therebetween having one or more longitudinally (axially) spaced circular disks with center holes, spaced by one or more portions of the circular disk which have been formed in an axial direction and serve to provide a spacing means and also a joining means to unitize the disks to each other.

According to the invention, a single disk can incorporate two axially opposed formed spacer portions, set at approximately 180° to each other from the disk center, which will allow spacing means and joining means to the first and second ends.

According to the invention, multiple disks, with two or more axially opposed formed spacer portions, set at some approximately equivalent rotational relationship to each other from the disk center, will allow spacing means and joining means to each other.

According to the invention, multiple disks with two axially aligned formed spacer portions, set at approximately 180° to each other from the disk center, will allow spacing means and joining means to each other.

According to the invention, multiple disks with three or more axially aligned formed spacer portions, set at some approximately equivalent rotational relationship to each other from the disk center will provide spacing means and joining means to each other.

According to the invention, unitizing or joining the circular disks to each other and to the first and second ends, can utilize brazing, welding, rivets, adhesives, or molding processes.

BRIEF DESCRIPTION OF THE SEVERAL VIEWS OF THE DRAWING

Reference will be made in detail to the preferred embodiment of the invention, examples of which are illustrated in the accompanying drawing figures. The figures are intended to be illustrative, not limiting. Although the invention is generally described in the context of this preferred embodiment, it should be understood that it is not intended to limit the scope of the invention to this particular embodiment.

Certain elements in selected views of the drawings may be illustrated not-to-scale, for illustrative clarity. Elements of the figures can be numbered such that similar (including identical) elements may be referred to with similar numbers in a single drawing. By way of example not related to the present description, each of a plurality of elements collectively referred to as 10, may be referred to individually as 10a, 10b, 10c, etc. Such relationships, if any, between similar elements in the same or different figures will become apparent throughout the specification, including, if applicable, in the claims and abstract.

Figure 1:
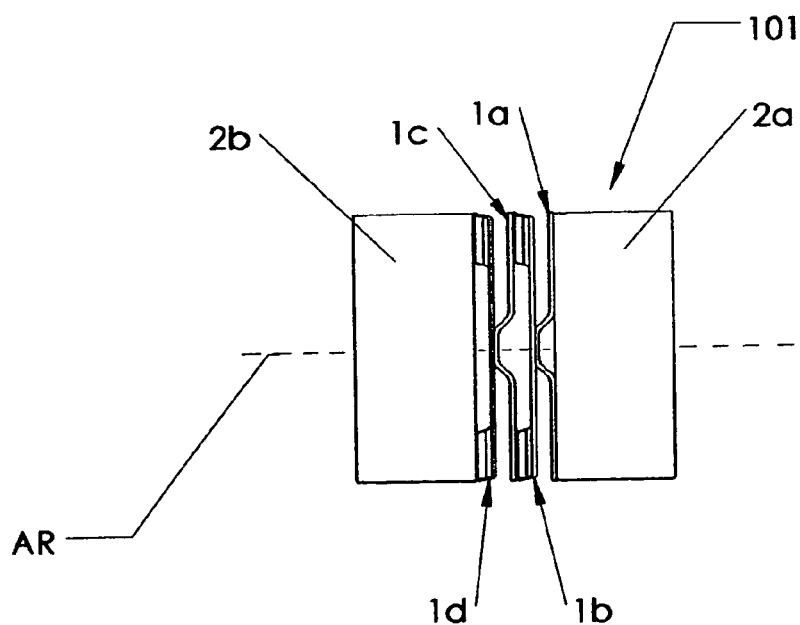
Figure 2:
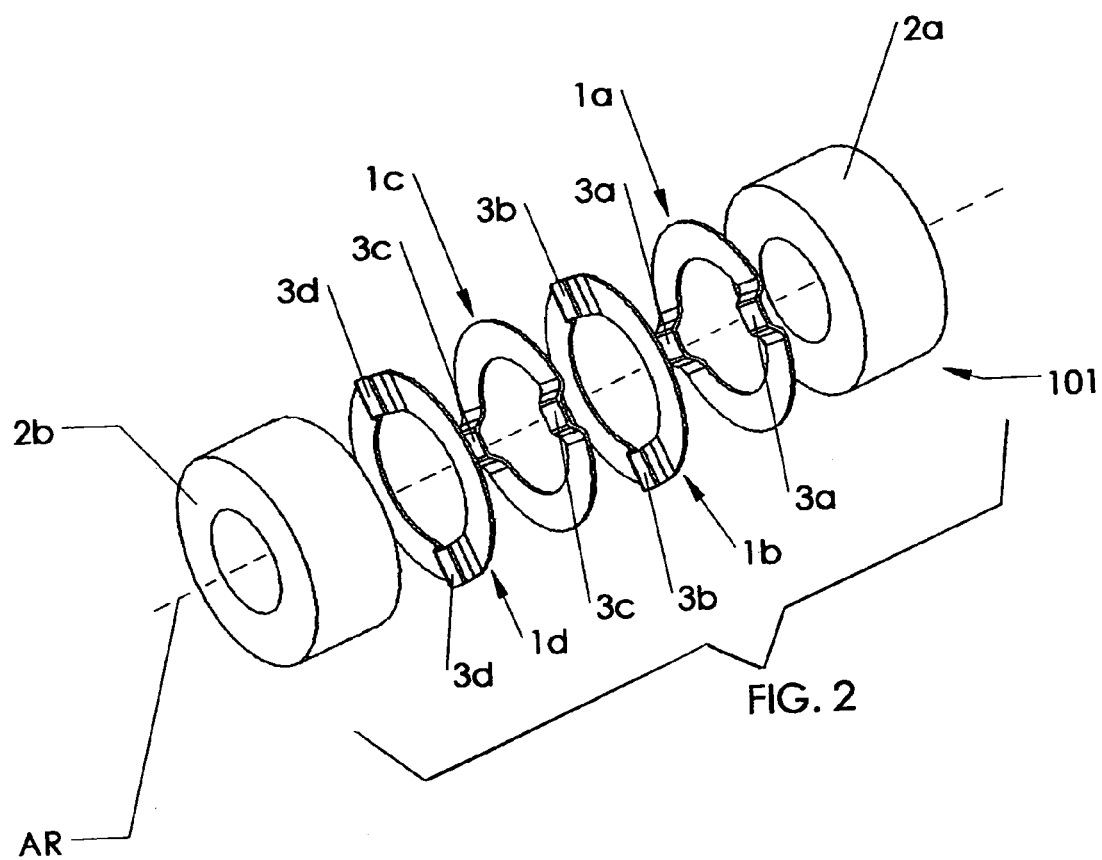
Figure 3:
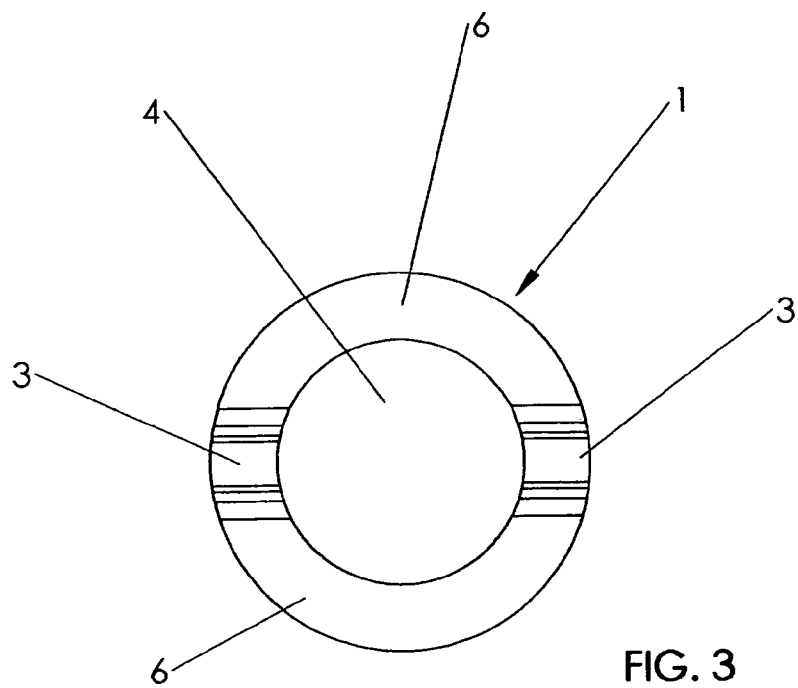
Figure 4:
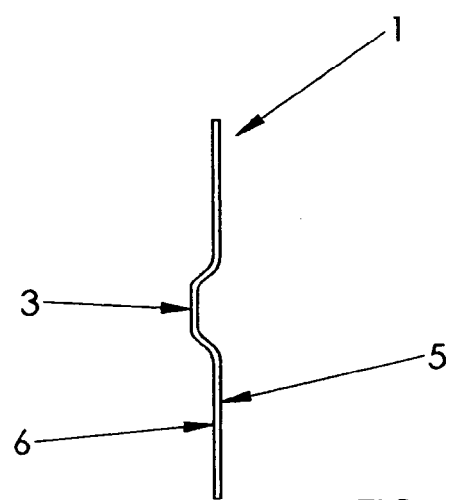
Figure 5:
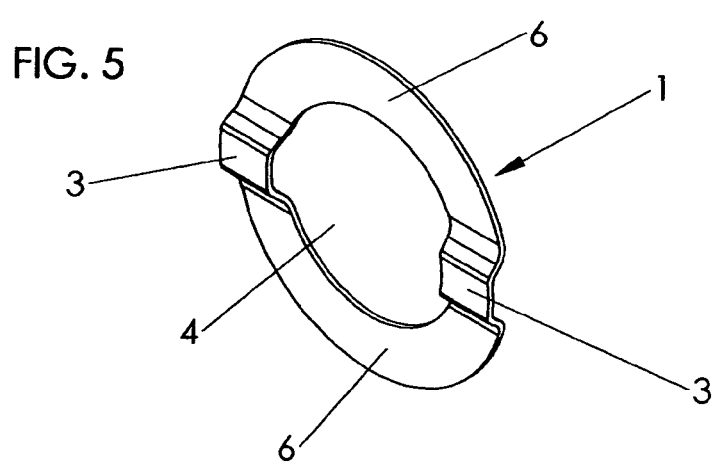
Figure 6:
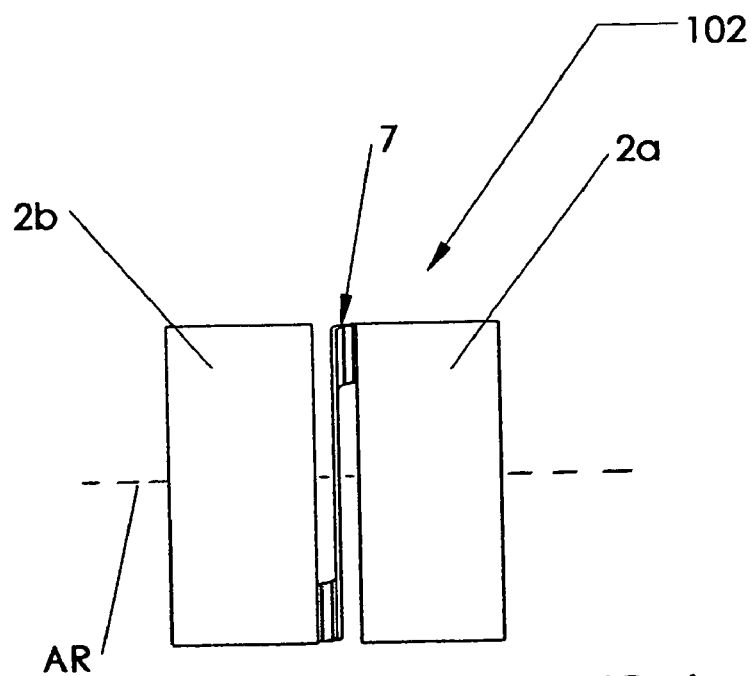
Figure 7:
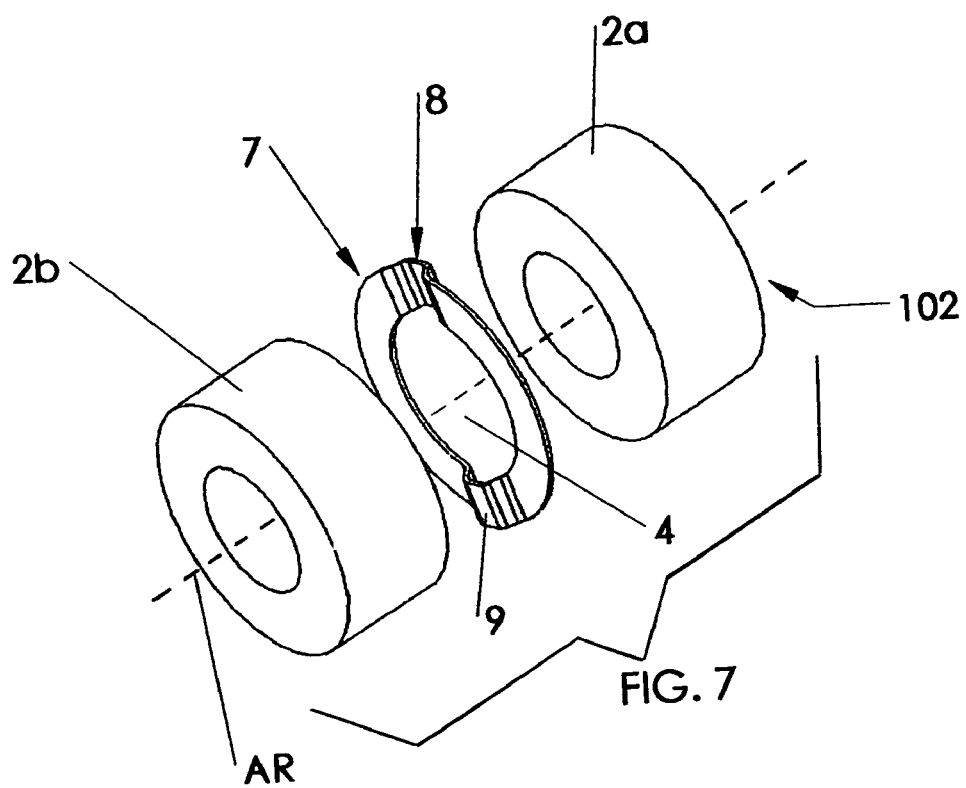
Figure 8:
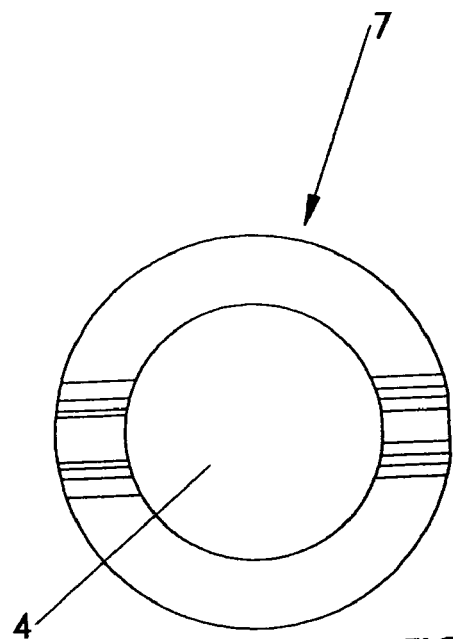
Figure 9:
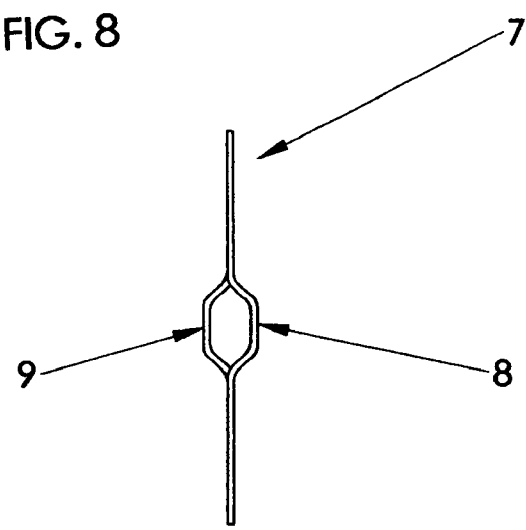
Figure 10:
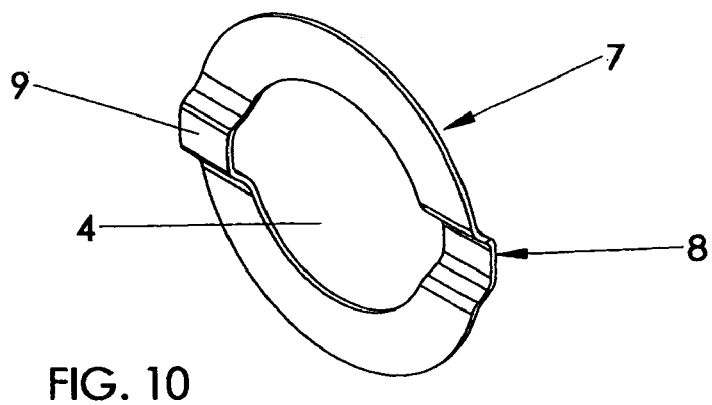
Figure 11:
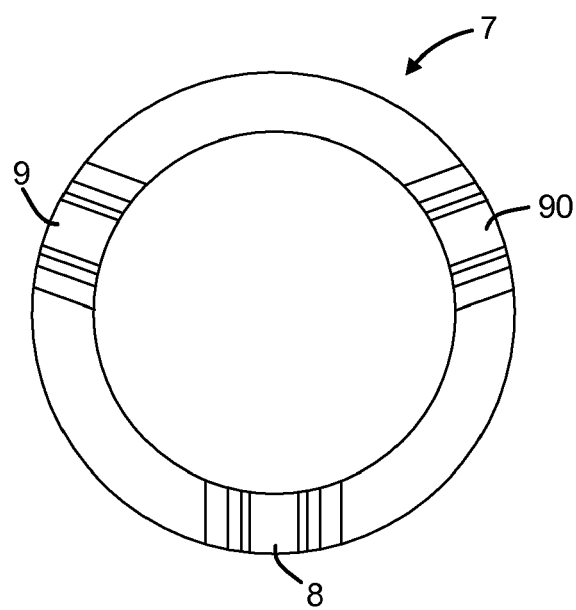
Figure 12:
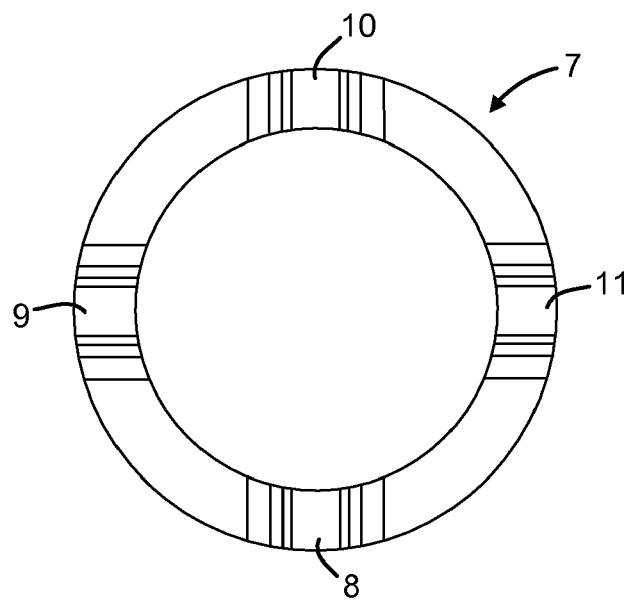

The structure, operation, and advantages of the present preferred embodiment of the invention will become further apparent upon consideration of the following description taken in conjunction with the accompanying drawings, wherein:

FIG. 1 is a side view of a flexible couple showing four disks, each with two formed spacer portions aligned in the same axial direction between a first and second end, according to the inventions;

FIG. 2 is an exploded perspective view of the flexible coupling of FIG. 1;

FIG. 3 is a front view of a disk with two formed spacer portions aligned in the same axial direction, according to the invention;

FIG. 4 is a side view of the disk as shown in FIG. 3;

FIG. 5 is a perspective view of the disk as shown in FIG. 3;

FIG. 6 is a side view of a flexible coupling, showing a single disk with two formed spacer portions aligned in axially opposite directions, between a first and second end, according to the invention;

FIG. 7 is an exploded perspective view of the flexible coupling of FIG. 6;

FIG. 8 is a front view of a disk with two formed spacer portions aligned in axially opposite directions, according to the invention;

FIG. 9 is a side view of the disk as shown in FIG. 8;

FIG. 10 is a perspective view of the disc disk as shown in FIG. 8;

FIG. 11 is a front view of a disk having three spacer portions;

FIG. 12 is a front view of a disk having four spacer portions.

DETAILED DESCRIPTION OF THE INVENTION

Referring now to FIG. 1 and FIG. 2, there is shown a flexible coupling 101 that is an embodiment of the present invention having four longitudinally (axially) spaced disks, between a first and second end. The flexible coupling 101 has four circular disks 1a, 1b, 1c, 1d (collectively referred to as disks), longitudinally spaced by axially aligned formed spacer portions 3a, 3b, 3c, 3d (collectively referred to as formed spacer portions). The disks are longitudinally spaced by the formed spacer portions between the first and second ends 2a, 2b and all components share a common axis of revolution AR, shown extending through the length of coupling 101. First and second ends 2a, 2b, which may have a different diameter than the disks, serve as hubs having means for coaxially connecting each of the first and second ends 2a, 2b to a driving and driven end respectively which are to be joined by the flexible coupling 101. Circular disk 1a is coaxially bonded to first end 2a along the common axis of rotation AR. Circular disk 1b is spaced from and bonded to disk 1a utilizing the two formed spacer portions 3a of disk 1a along AR. The formed spacer portions 3b of disk 1b are rotationally offset from the formed spacer portions 3a of disk 1a so as to provide for maximum flexibility of the unitized disk assembly. This rotational offset of the formed spacer portions is carried progressively through longitudinally adjacent disks 1a, 1b, 1c, 1d as they are bonded together in longitudinal sequence along the common axis AR. The second end 2b, is bonded to the formed spacer portion 3d of disk 1d along AR. This creates the unitized structure previously identified as flexible coupling 101.

FIGS. 3 through 5 show a disk 1 that illustrates an example of disk according to the invention and is displayed in FIG. 1 and FIG. 2 as 1a, 1b, 1c, 1d. As is readily apparent from the drawings, there are two formed spacer portions 3, which are rotationally offset from each other and are axially aligned in the same direction from the upper surface 6 of disk 1 and away from the bottom surface 5 of disk 1. These formed spacer portions 3 can vary in number, shape, axial displacement, and rotational spacing. In disk 1 center hole 4 can be of varying size, larger to increase disk flexibility, smaller to increase disk strength. The thickness of material utilized in disk 1 can also vary, with thicker material used to increase disk strength and thinner material to increase disk flexibility. The type of material used for ends 2a, 2b and disk 1 can vary and can be metallic or non-metallic in nature.

Flexibility of the flexible coupling 101 is created through flexing of the disks 1, which when unitized to longitudinally adjacent disks utilizing the formed spacer portions 3, retain the flexibility of the disk portion between the formed spacer portions 3.

Referring to FIG. 6 and FIG. 7, there is shown a flexible coupling 102 that is an embodiment of the present invention having a disk 7 with axially opposed formed spacer portions 8 and 9. The disk is longitudinally aligned along the common axis of rotation AR between the first and second ends 2a, 2b which serve as hubs having means for coaxially connecting each of the first and second ends 2a, 2b to a driving and driven end respectively which are to be joined by the flexible coupling 102. Disk 7 is coaxially bonded to the first end 2a along AR utilizing the formed spacer portion 8 and is bonded to the second end 2b along AR utilizing the formed spacer portion 9. This creates the unitized structure previously identified as flexible coupling 102.

FIGS. 8 through 10 show a disk 7 that illustrates an example of a disk according to the invention and displayed in FIG. 6 and FIG. 7 as disk 7. As is readily apparent from the drawings, there are two formed spacer portions 8 and 9 which are rotationally offset from each other and are axially aligned in opposite directions from each other. These formed spacer portions can vary in number (two being the minimum), size, shape, axial displacement, and rotational spacing. In disk 7, center hole 4 can be of varying size, larger to increase disk flexibility, smaller to increase disk strength. The thickness of material utilized in disk 7 can also vary, with thicker material used to increase disk strength and thinner material to increase disk flexibility. The type of material used for ends 2a, 2b and disk 7 can vary and can be metallic or non-metallic in nature.

Flexibility of the flexible coupling 102 is created through the flexing of disk 7 in the areas between formed spacer portions 8 and 9. In the present invention, bonding of the disks to each other or to the first or second ends can be accomplished through brazing, welding, riveting, adhesives, or molding. Because disks as set forth herein can be bonded together, it will be seen that disks as set forth herein can be formed from separate pieces of material. In FIG. 11, there is shown a disk 7 having three spacer portions 8, 9, and 10. In FIG. 12 there is shown a disk having four spacer portions 8, 9, 10, 11.

Compared to prior art designs, the present invention maintains excellent torsional stiffness, while allowing improved axial, radial, and angular flexibility for accommodating joined rotating members which have angular, radial, or axial misalignment. The present invention enables the design of flexible couplings which are economical to produce with molded or stamped disks, yet can provide improved operating characteristics over prior art designs. Based on various side and perspective views of disks as set forth herein in FIGS. 1, 2, 4, 6, 7, 9, 10 it can be seen that a disk as set forth herein can include a substantially uniform thickness throughout a major body portion thereof and throughout an area forming a spacer portion. It can also be seen that a disk as set forth herein can include a substantially uniform thickness throughout a major body portion and throughout areas defining first and second radially spaced apart spacer portions. It can also be seen that a disk as set forth herein can be devoid of material at an elevation of a disk major body portion in an area of a spacer portion.

While this invention has been described in the specification and illustrated in the drawings with respect to a preferred embodiment, it is understood that all changes and modifications that come within the spirit of the invention are desired to be protected. Undoubtedly many variations or equivalents may be substituted for elements of the invention by one having ordinary skill in the art to which the present invention most nearly pertains, and such variations are intended to be within the scope of the invention, as disclosed herein;

What is claimed is:

1. A flexible coupling for flexibly joining two moveable members, the flexible coupling comprising:
    a unitized body having a first end, a second end, and therebetween having two or more longitudinally spaced disks, said disks having a center hole, wherein adjacent ones of the longitudinally spaced disks are formed from separate pieces of material that are joined together;
    each disk of the two or more longitudinally spaced disks being coaxial to the first and second end, and having two or more axial facing portions of said disk formed in a common axial direction to act as a spacer portion, wherein each disk of the two or more longitudinally spaced disks includes a substantially uniform thickness throughout a major body portion thereof and throughout areas forming the spacer portions; and means for joining each disk of the two or more longitudinally spaced disks, each aligned in a common axial direction to each longitudinally adjacent disk utilizing a surface of a formed spacer portion; and means for joining the disk longitudinally adjacent to the first end, to the first end; and means for joining the disk longitudinally adjacent to the second end, to the second end; and means at the first end for coaxially connecting the first end to a first one of the two moveable members, and means at the second end for connecting the second end to a second one of two moveable members.

2. The flexible coupling of claim 1, wherein; the means for joining each disk to each other is brazing.

3. The flexible coupling of claim 1, wherein; the means for joining each disk to each other is welding.

4. The flexible coupling of claim 1, wherein; the means for joining each disk to each other is riveting.

5. The flexible coupling of claim 1, wherein; the means for joining each disk to each other is adhesives.

6. The flexible coupling of claim 1, wherein; the means for joining each disk to each other is molding.

7. The flexible coupling of claim 1, wherein there is disposed between the first end and the second end a certain number of disks equal to the number of the two or more longitudinally spaced disks.

8. A flexible coupling for flexibly joining two moveable members, the flexible coupling comprising:

a unitized body having a first end, a second end, and therebetween having one or more longitudinally spaced disks, said disks having a center hole;

each disk of the one or more longitudinally spaced disks being coaxial to the first and second end, and having two or more portions extending longitudinally relative to a major body portion of said each disk to act as spacer portions, wherein each disk of the one or more longitudinally spaced disks is devoid of material at an elevation of the major body portion in an area of a spacer portion; and means for joining each disk of the one or more longitudinally spaced disks, each aligned in a common axial direction, to each longitudinally adjacent disk utilizing a surface of a formed spacer portions; and means for joining the disk longitudinally adjacent to the first end, to the first end; and means for joining the disk longitudinally adjacent to the second end, to the second end; and means at the first end for coaxially connecting the first end to a first one of the two moveable members, and means at the second end for coaxially connecting the second end to a second one of the two moveable members.

9. The flexible coupling of claim 8, wherein the means for joining each disk to each other is brazing.

10. The flexible coupling of claim 8, wherein the means for joining each disk to each other is welding.

11. The flexible coupling of claim 8, wherein the means for joining each disk to each other is riveting.

12. The flexible coupling of claim 8, wherein the means for joining each disk to each other is adhesives.

13. The flexible coupling of claim 8, wherein the means for joining each disk to each other is molding.

14. The flexible coupling of claim 8, wherein said two or more portions extending longitudinally relative to a major body portion of said each disk extend longitudinally in a common direction.

15. The flexible coupling of claim 8, wherein said two or more portions extending longitudinally relative to a major body portion of said each disk extend longitudinally in opposite directions.

16. The flexible coupling of claim 8, wherein said two or more portions extending longitudinally relative to a major body portion of said each disk extend longitudinally in opposite directions in an alternating rotational sequence.

17. The flexible coupling of claim 8, wherein the major body portion of said each disc includes an upper surface and a bottom surface.

18. The flexible coupling of claim 8, wherein said two or more portions extending longitudinally relative to a major body portion of said each disk extend in a common direction.

19. The flexible coupling of claim 8, wherein there is disposed between the first end and the second end a certain number of disks equal to the number of the one or more longitudinally spaced disks.

20. The flexible coupling of claim 8, wherein said one or more longitudinally spaced disks is a single disk having a first spacer portion extending longitudinally in a first direction from a major body of the single disk and a second spacer portion extending from the major body portion of the single disk in a direction opposite the first direction, said first spacer portion being joined to said first hub, the second spacer portion being joined to said second hub.

21. A flexible coupling for use in flexibly joining a driving rotating member to a driven rotating member, said flexible coupling comprising:

a unitized body having a first hub and a second hub;

a plurality of longitudinally spaced disks disposed intermediate of said first hub, and said second hub, each of the plurality of longitudinally spaced disks having an upper surface, a lower surface, and being arranged coaxially with each said first and second hub, wherein adjacent ones of the disks of the plurality of the longitudinally spaced disks are formed from separate pieces of material that are joined together;

wherein a disk of the plurality of longitudinally spaced disks adjacent said first hub is joined to said first hub;

wherein a disk of the plurality of longitudinally spaced disks adjacent said second hub is joined to said second hub; and wherein a certain disk of the plurality of longitudinally spaced disks includes first and second radially spaced apart spacer portions, each of the first and second radially spaced apart spacer portions extending longitudinally relative to a major body portion of the certain disk;

wherein the certain disk includes a substantially uniform thickness throughout the major body portion and throughout areas defining the first and second radially spaced apart spacer portions.

22. The flexible coupling of claim 21, wherein the plurality of disks are arranged so that each of the plurality of disks is joined to an adjacent disk.

23. The flexible coupling of claim 21, wherein the plurality of disks are arranged so that each disk of the plurality of disks is joined to an adjacent disk, wherein each disk of the plurality of disks includes first and second radially spaced apart spacer portions and wherein said spacer portions of said each disk of the plurality of disks are radially offset relative to said spacer portions of an adjacent disk.

24. The flexible coupling of claim 21, wherein a set of adjacent disks of the plurality of disks are joined by brazing.

25. The flexible coupling of claim 21, wherein a set of adjacent disks of the plurality of disks are joined by welding.

26. The flexible coupling of claim 21, wherein a set of adjacent disks of the plurality of disks are joined by riveting.

27. The flexible coupling of claim 21, wherein a set of adjacent disks of the plurality of disks are joined by adhesives.

28. The flexible coupling of claim 21, wherein a set of adjacent disks of the plurality of disks are joined by molding.

29. The flexible coupling of claim 21, wherein said two or more portions extending longitudinally relative to the major body portion of the certain disk extend longitudinally in a common direction.

30. The flexible coupling of claim 21, wherein said two or more portions extending longitudinally relative to the major body portion of the certain disk extend longitudinally in opposite directions.

31. The flexible coupling of claim 21, wherein said two or more portions extending longitudinally relative to the major body portion of the certain disk extend longitudinally in opposing directions in an alternating rotational sequence.

32. The flexible coupling of claim 21, wherein the certain disk is formed by stamping.

33. The flexible coupling of claim 21, wherein the certain disk is configured for flexing in an area between the first and second radially spaced apart spacer portions.

34. The flexible coupling of claim 21, wherein the certain disk is devoid of material at an elevation of the major body portion in an area of the first spacer portion.

35. The flexible coupling of claim 21 wherein the certain disk is formed by stamping.

36. The flexible coupling of claim 21, wherein there is disposed between the first hub and the second hub a certain number of disks equal to the number of the plurality of disks.

37. A flexible coupling for use in flexibly joining a driving rotating member to a driven rotating member, said flexible coupling comprising:
  a unitized body having a first hub and a second hub;
  one or more longitudinally spaced disks disposed intermediate of said first hub, and said second hub, each of said one or more longitudinally spaced disks having an upper surface, a lower surface, and being arranged coaxially with each said first and second hub;
  wherein a disk of said one or more longitudinally spaced disks adjacent said first hub is joined to said first hub;
  wherein a disk of said one or more longitudinally spaced disks adjacent said second hub is joined to said second hub; and
  wherein a certain disk of said one or more longitudinally spaced disks includes first, second, and third radially spaced apart spacer portions, each spacer portion extending longitudinally relative to a major body portion of the certain disk.

38. The flexible coupling of claim 37, wherein said one or more longitudinally spaced disks is a single disk having a first spacer portion extending longitudinally in a first direction from a major body portion of the single disk and a second spacer portion extending from the major body portion of the single disk in a direction opposite the first direction, said first spacer portion being joined to said first hub, the second spacer portion being joined to said second hub.

39. The flexible coupling of claim 37, wherein said one or more longitudinally spaced disks is a plurality of disks and wherein the plurality of disks are arranged so that each of the plurality of disks is joined to an adjacent disk.

40. The flexible coupling of claim 37, wherein said one or more longitudinally spaced disks is provided by a plurality of disks and wherein the plurality of disks are arranged so that each disk of the plurality of disks is joined to an adjacent disk; and wherein said spacer portions of said each disk are radially offset relative to said spacer portions of an adjacent disk.

41. The flexible coupling of claim 37, wherein said one or more longitudinally spaced disks is provided by a plurality of disks and wherein a set of adjacent disks of the plurality of disks are joined by brazing.

42. The flexible coupling of claim 37, wherein said one or more longitudinally spaced disks is provided by a plurality of disks and wherein a set of adjacent disks of the plurality of disks are joined by welding.

43. The flexible coupling of claim 37, wherein said one or more longitudinally spaced disks is provided by a plurality of disks and wherein a set of adjacent disks of the plurality of disks are joined by riveting.

44. The flexible coupling of claim 37, wherein said one or more longitudinally spaced disks is provided by a plurality of disks and wherein a set of adjacent disks of the plurality of disks are joined by adhesives.

45. The flexible coupling of claim 37, wherein said one or more longitudinally spaced disks is provided by a plurality of disks and wherein a set of adjacent disks of the plurality of disks are joined by molding.

46. The flexible coupling of claim 37, wherein said first and second radially spaced apart spacer portions extending longitudinally relative to the major body portion of the certain disk extend longitudinally in a common direction.

47. The flexible coupling of claim 37, wherein said first and second radially spaced apart spacer portions extending longitudinally relative to the major body portion of the certain disk extend longitudinally in opposite directions.

48. The flexible coupling of claim 37, wherein the certain disk includes a fourth radially spaced apart spacer portion extending longitudinally relative to the major body portion, and wherein said first, second, third and fourth radially spaced apart spacer portions extending longitudinally relative to the major body portion of the certain disk extend longitudinally in opposing directions in an alternating rotational sequence.

49. The flexible coupling of claim 37, wherein said one or more longitudinally spaced disks includes a plurality of disks, each of the plurality of disks including first, second, and third radially spaced apart spacer portions, each spacer portion extending longitudinally relative to a major body portion of its respective disk.

50. The flexible coupling of claim 37, wherein there is disposed between the first hub and the second hub a certain number of disks equal to the number of the one or more longitudinally spaced disks.

* * * * *